(12) United States Patent
Zhu et al.

(10) Patent No.: US 11,799,168 B2
(45) Date of Patent: Oct. 24, 2023

(54) BOX, BATTERY, AND APPARATUS

(71) Applicant: JIANGSU CONTEMPORARY AMPEREX TECHNOLOGY LIMITED, Changzhou (CN)

(72) Inventors: Tingting Zhu, Changzhou (CN); Liwen Jiang, Changzhou (CN)

(73) Assignee: JIANGSU CONTEMPORARY AMPEREX TECHNOLOGY LIMITED, Changzhou (CN)

(*) Notice: Subject to any disclaimer, the term of this patent is extended or adjusted under 35 U.S.C. 154(b) by 0 days.

(21) Appl. No.: 17/876,031

(22) Filed: Jul. 28, 2022

(65) Prior Publication Data

US 2022/0367972 A1 Nov. 17, 2022

Related U.S. Application Data

(63) Continuation of application No. PCT/CN2021/073916, filed on Jan. 27, 2021.

(30) Foreign Application Priority Data

Oct. 19, 2020 (CN) .......................... 202011120254.9

(51) Int. Cl.
*H01M 50/383* (2021.01)
*H01M 50/317* (2021.01)
(Continued)

(52) U.S. Cl.
CPC ....... *H01M 50/383* (2021.01); *H01M 10/613* (2015.04); *H01M 10/625* (2015.04);
(Continued)

(58) Field of Classification Search
None
See application file for complete search history.

(56) References Cited

U.S. PATENT DOCUMENTS

2020/0067045 A1* 2/2020 Takano ............... H01M 50/342
2020/0251703 A1* 8/2020 Aldrich ............... H01M 50/383
(Continued)

FOREIGN PATENT DOCUMENTS

CN 205488293 U 8/2016
CN 208797082 * 4/2019 ............. H01M 2/10
(Continued)

OTHER PUBLICATIONS

First Office Action received in the corresponding Chinese Application 202110099357.X, dated May 24, 2023.
(Continued)

*Primary Examiner* — Amanda J Barrow
(74) *Attorney, Agent, or Firm* — Kilpatrick Townsend & Stockton LLP (57) ABSTRACT

Embodiments of this application provide a box, a battery, and an apparatus, and relate to the field of battery technologies. The box is provided with a discharge hole, and the discharge hole is configured to discharge, from inside the box, flame produced when thermal runaway occurs in a battery cell. The box is further provided with a fire extinguishing member that is configured to extinguish the flame for cooling when the flame passes through the discharge hole. In this application, the discharge hole and the fire extinguishing member are arranged in the box, so that when the flame produced when thermal runaway occurs in the battery cell passes through the discharge hole, the fire extinguishing member can release a fire extinguishing agent to extinguish the flame for cooling. This prevents the flame from being discharged from inside the box through the discharge hole, thereby improving safety performance of the battery.

7 Claims, 8 Drawing Sheets

(51) Int. Cl.
*H01M 10/613* (2014.01)
*H01M 10/625* (2014.01)
*H01M 10/6563* (2014.01)
*H01M 10/6566* (2014.01)

(52) U.S. Cl.
CPC ... *H01M 10/6563* (2015.04); *H01M 10/6566* (2015.04); *H01M 50/317* (2021.01); *H01M 2220/20* (2013.01)

(56) References Cited

U.S. PATENT DOCUMENTS

2020/0303701 A1* 9/2020 Kim .................... H01M 50/271
2021/0074979 A1* 3/2021 Kwak .................. H01M 4/364

FOREIGN PATENT DOCUMENTS

| CN | 110660945 A | | 1/2020 | |
| CN | 111192989 | * | 5/2020 | .............. H01M 2/12 |
| CN | 111584792 | * | 8/2020 | .............. H01M 2/12 |
| CN | 211556016 | * | 9/2020 | .............. H01M 2/12 |
| JP | 2009212081 A | | 9/2009 | |
| JP | 2012079510 A | | 4/2012 | |
| JP | 2014241245 A | | 12/2014 | |
| JP | 2018527704 A | | 9/2018 | |
| WO | 2012081137 A1 | | 6/2012 | |
| WO | 2017213132 A1 | | 12/2017 | |
| WO | 2018105878 A1 | | 6/2018 | |

OTHER PUBLICATIONS

First Office Action received in the corresponding Japanese Application 2022-541263, dated Aug. 17, 2023.

* cited by examiner

FIG. 14

BOX, BATTERY, AND APPARATUS

CROSS-REFERENCE TO RELATED APPLICATIONS

This application is a continuation of International Patent Application No. PCT/CN2021/073916, filed on Jan. 27, 2021, which claims priority to Chinese Patent Application No. 202011120254.9, filed on Oct. 19, 2020. The aforementioned patent applications are incorporated herein by reference in their entirety.

TECHNICAL FIELD

This application relates to the field of battery technologies, and in particular, to a box, a battery, and an apparatus.

BACKGROUND

With the widespread application of new energy vehicles, batteries are widely used in new energy vehicles as power output apparatuses of the new energy vehicles.

A battery usually includes a box and a plurality of battery cells located inside the box. High-temperature gas and/or flame are/is produced when thermal runaway occurs in a battery cell, and the high-temperature gas and/or flame are/is released into the box through an explosion-proof valve of the battery cell. In order to transfer the high-temperature gas and/or flame to outside the box, a discharge hole is usually provided on a side wall of the box so as to discharge the high-temperature gas and/or flame out of the box through the discharge hole.

However, when the high-temperature gas is discharged out of the box through the discharge hole, the flame is also discharged out of the box. As a result, safety performance of the battery is reduced.

SUMMARY

Embodiments of this application provide a box, a battery, and an apparatus, to extinguish and cool flame produced when thermal runaway occurs in a battery cell, thereby improving safety performance of the battery.

To achieve the foregoing objective, embodiments of this application provide the following solutions.

A first aspect of an embodiment of this application provides a box for a battery. The box is provided with a discharge hole, and the discharge hole is configured to discharge, from inside the box, flame produced when thermal runaway occurs in a battery cell. The box is further provided with a fire extinguishing member, and the fire extinguishing member is configured to extinguish the flame for cooling when the flame passes through the discharge hole.

In this embodiment, the discharge hole and the fire extinguishing member are arranged in the box, so that when the flame produced when thermal runaway occurs in a battery cell passes through the discharge hole, the fire extinguishing member can release a fire extinguishing agent to extinguish the flame for cooling. This prevents the flame from being discharged from inside the box through the discharge hole, thereby improving safety performance of the battery.

In some embodiments, the fire extinguishing member is arranged at a periphery of the discharge hole.

In this embodiment, the fire extinguishing member is arranged at the periphery of the discharge hole, so that when the flame passes through the discharge hole, the fire extinguishing member is capable of extinguishing and cooling the flame in a timely manner. This prevents the flame from being discharged from the discharge hole to outside the box, and avoids a threat to safety of an apparatus and a user using the battery, thereby improving safety performance of the battery.

In some embodiments, the fire extinguishing member is configured to cover a part of the discharge hole.

In this embodiment, the fire extinguishing member is configured to cover a part of the discharge hole, so that when the flame passes through the discharge hole, the flame can quickly come into contact with the fire extinguishing member, and the fire extinguishing member is capable of extinguishing and cooling the flame in a timely manner. This prevents the flame from being discharged from the discharge hole to outside the box, and avoids a threat to safety of an apparatus and a user using the battery, thereby improving safety performance of the battery.

In addition, in this embodiment, the fire extinguishing member does not cover the entire discharge hole. In this way, when thermal runaway does not occur in the battery cell, gas inside an accommodation cavity can be discharged from inside the box through the discharge hole, to keep atmospheric pressure balance between inside and outside of the box and improve safety of the battery.

In some embodiments, the box includes a bottom wall and a side wall connected to a periphery of the bottom wall, the bottom wall and the side wall enclose an accommodation cavity for disposing the battery cell, and the discharge hole is arranged on the side wall and/or the bottom wall.

In this embodiment, the discharge hole is arranged on the side wall and/or the bottom wall, which can quickly guide the flame to the discharge hole, prevent the flame from gathering inside the box, and reduce a risk of fire in the battery cell.

In some embodiments, there is a discharge passage inside the side wall and/or the bottom wall, one end of the discharge passage is connected to the discharge hole, and the other end of the discharge passage is connected to outside the box.

In this embodiment, there is a discharge passage inside the side wall and/or the bottom wall. The discharge passage is provided to buffer gas produced by thermal runaway and prevent the box from being damaged by an excessively high speed of the gas.

In some embodiments, the box further includes a pressure relief valve, the other end of the discharge passage is connected to outside the box through the pressure relief valve, and the pressure relief valve is configured to discharge internal pressure of the discharge passage when the internal pressure reaches a threshold.

In this embodiment, the pressure relief valve is provided to facilitate timely and effective discharge of emissions of the battery cell to outside the box.

In some embodiments, the fire extinguishing member is arranged inside the discharge passage.

In this embodiment, the fire extinguishing member is arranged inside the discharge passage to extinguish the flame for the second time. In this way, the flame is extinguished twice, which can ensure that gas discharged to outside the box basically contains no or extremely low content of flame, thereby improving safety of the battery.

In some embodiments, the fire extinguishing member is constructed as a fire extinguishing plate including a fire extinguishing agent, the fire extinguishing plate is fastened inside the box, and the fire extinguishing plate is configured to release the fire extinguishing agent when the flame passes through the discharge hole to extinguish the flame for cooling.

In this embodiment, the fire extinguishing member is constructed as the fire extinguishing plate including the fire extinguishing agent, which facilitates arrangement of the fire extinguishing agent. When the flame passes through the discharge hole, the fire extinguishing agent absorbs a large amount of heat and experiences a physical heat absorption process such as hot melting or gasification, so that the gasified fire extinguishing agent spreads to the discharge hole through an opening, to extinguish the flame for cooling.

In some embodiments, the fire extinguishing plate is provided with a through hole, and the through hole is connected to the discharge hole.

In this embodiment, the fire extinguishing plate is provided with a through hole connected to the discharge hole, which can facilitate release of the fire extinguishing agent and improve a fire extinguishing and cooling effect of the fire extinguishing member.

In some embodiments, the box further includes an accommodation groove, the accommodation groove is configured to accommodate the fire extinguishing member, and the discharge hole is arranged on a groove wall of the accommodation groove.

In this embodiment, the accommodation groove is provided to increase accommodation space configured to install the fire extinguishing member, so that a plurality of fire extinguishing members can be installed inside the accommodation groove and a fire extinguishing effect of the fire extinguishing member is improved.

In addition, the accommodation groove may further store vapor coming from outside the box into the box, to prevent the vapor from coming into contact with a positive electrode terminal and/or a negative electrode terminal of the battery cell to cause a short circuit of the battery cell and affect service life of the battery cell.

In some embodiments, the box further includes a guide member, where the guide member is connected to the periphery of the discharge hole, and the guide member is configured to guide the flame to the discharge hole.

In this embodiment, the guide member is provided to guide the flame to the discharge hole to prevent the flame from gathering inside the box, and reduce a risk of fire in the battery cell.

In some embodiments, the guide member includes a guide channel connected to the discharge hole, and the fire extinguishing member is arranged inside the guide channel.

In this embodiment, the guide channel having the fire extinguishing member is arranged inside the guide member, so that when the flame is transferred to the guide channel, the flame can quickly come into contact with the fire extinguishing member, and the flame can be extinguished and cooled in a timely and efficient manner.

In some embodiments, the guide member includes a barrel body with openings at both ends, an internal chamber of the barrel body is configured to form the guide channel, and a diameter of the barrel body gradually increases from an end close to the discharge hole to an end far away from the discharge hole.

In this embodiment, the diameter of the barrel body is designed so that an eddy effect is formed inside the barrel body, which can transmit high-temperature high-pressure gas, flame, or other substances produced by the battery cell into the discharge passage of the box in a timely and efficient manner, thereby facilitating extinguishing and cooling of the high-temperature high-pressure gas and flame and improving safety performance of the battery.

In some embodiments, the guide member further includes a fan, and the fan is configured to start when thermal runaway occurs in the battery cell to promote flowing of the flame to the discharge hole.

In this embodiment, the fan is provided to quickly transmit the flame produced when thermal runaway occurs in the battery cell to the discharge hole and to the discharge passage, so as to extinguish the flame for cooling by using the fire extinguishing member, thereby improving the safety performance of the battery.

In some embodiments, the guide member further includes a fan guard configured to protect the fan, the fan guard is fastened inside the box, and the fan is arranged inside the fan guard.

In this embodiment, the fan is protected by using the fan guard to increase service life of the fan.

A second aspect of an embodiment of this application provides a battery, including the foregoing box and a battery cell. The box has an accommodation cavity, and the battery cell is arranged inside the accommodation cavity.

Because the battery in this embodiment includes the foregoing box, when flame produced when thermal runaway occurs in the battery cell passes through a discharge hole, a fire extinguishing member can release a fire extinguishing agent to extinguish the flame for cooling. This prevents the flame from being discharged from inside the box through the discharge hole, thereby improving safety performance of the battery.

A third aspect of an embodiment of this application provides an apparatus, including the foregoing battery, where the battery is configured to supply electric energy.

Because the apparatus in this embodiment includes the foregoing battery, when flame produced when thermal runaway occurs in a battery cell passes through a discharge hole, a fire extinguishing member can release a fire extinguishing agent to extinguish the flame for cooling. This prevents the flame from being discharged from inside a box through the discharge hole, thereby improving safety performance of the battery.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

In the accompanying drawings, the figures are not drawn to scale.

Reference signs are described as follows:

100: apparatus; 10: vehicle body; 20: battery; 21: box; 211: bottom wall; 212: side wall; 2121: first side face; 2122: second side face; 213: accommodation cavity; 214: spacer plate; 215: discharge hole; 216: discharge passage; 217: pressure relief valve; 218: connection plate; 219: reinforcing plate; 22: battery cell; 221: positive electrode terminal; 222: negative electrode terminal; 223: explosion-proof valve; 23: fire extinguishing member; 24: accommodation groove; 25: guide member; 251: barrel body; 252: guide channel; 253: fan; 30: drive mechanism; 40: controller; and 50: wheel.

DETAILED DESCRIPTION

The following further describes the embodiments of this application in detail with reference to the accompanying drawings and implementations. The detailed description and accompanying drawings of the following embodiments are used to illustrate the principle of this application, but are not intended to limit the scope of this application, that is, this application is not limited to the described embodiments.

In the descriptions of this application, it should be understood that, unless otherwise specified, "a plurality of" means more than two; orientations or position relationships indicated by the terms "up", "down", "left", "right", "inside", "outside", and the like are merely intended to simplify description of this application for a purpose of easy description, rather than indicating or implying that an apparatus or a part must have a particular direction or must be constructed and operated in a particular orientation, and therefore shall not be construed as any limitation on this application. In addition, the terms "first", "second", "third", and the like are merely intended for a purpose of description, and shall not be understood as an indication or implication of relative importance. "Perpendicular" is not strictly perpendicular, but within an allowable range of error. "Parallel" is not strictly parallel, but within an allowable range of error.

The orientation terms appearing in the following description all are directions shown in the figures, and do not limit the specific structure of the application. In the descriptions of this application, it should also be noted that, unless otherwise specified and defined explicitly, the terms "mounted", "interconnected" and "connected" are to be interpreted in a broad sense, for example, may be fixedly connected, or detachably connected, or integrally connected, may be directly connected, or indirectly connected through an intermediate medium. A person of ordinary skill in the art can understand specific meanings of these terms in this application based on specific situations.

The applicant of this application has found during actual work that when a battery cell is impacted by the outside or affected by the battery cell itself, for example, when the battery cell is overcharged/overdischarged or the battery cell is short-circuited, thermal runaway may occur in the battery cell. When thermal runaway occurs in the battery cell, the battery cell releases flame, and the flame may cause fire inside a box, threatening safety of a battery and safety of an apparatus using the battery.

For the foregoing technical problem, embodiments of this application provide a box, a battery, and an apparatus. A discharge hole and a fire extinguishing member are provided in the box, so that when flame produced when thermal runaway occurs in a battery cell passes through the discharge hole, the fire extinguishing member can release a fire extinguishing agent to extinguish the flame for cooling. This prevents the flame from being discharged from inside the box through the discharge hole, thereby improving safety performance of the battery and safety performance of an apparatus using the battery.

In a specific embodiment, an embodiment of this application provides an apparatus 100, including a battery 20, where the battery 20 is configured to supply electric energy to the apparatus 100. The apparatus 100 provided in this embodiment of this application may be a vehicle. For example, the vehicle may be a fuel vehicle, a gas vehicle, or a new energy vehicle, and the new energy vehicle may be a battery electric vehicle, a hybrid electric vehicle, an extended-range electric vehicle, or the like.

In addition, the apparatus 100 may alternatively be another energy storage apparatus, such as a mobile phone, a portable device, a notebook computer, an electric toy, an electric tool, a ship, or a spacecraft, where the spacecraft may be an aircraft, a rocket, a space shuttle, or a spacecraft.

The battery described in this embodiment of this application is not limited to being applied to the apparatus 100 described above. However, for brevity of description, a vehicle is used as an example for description of the following embodiments.

Figure 1:
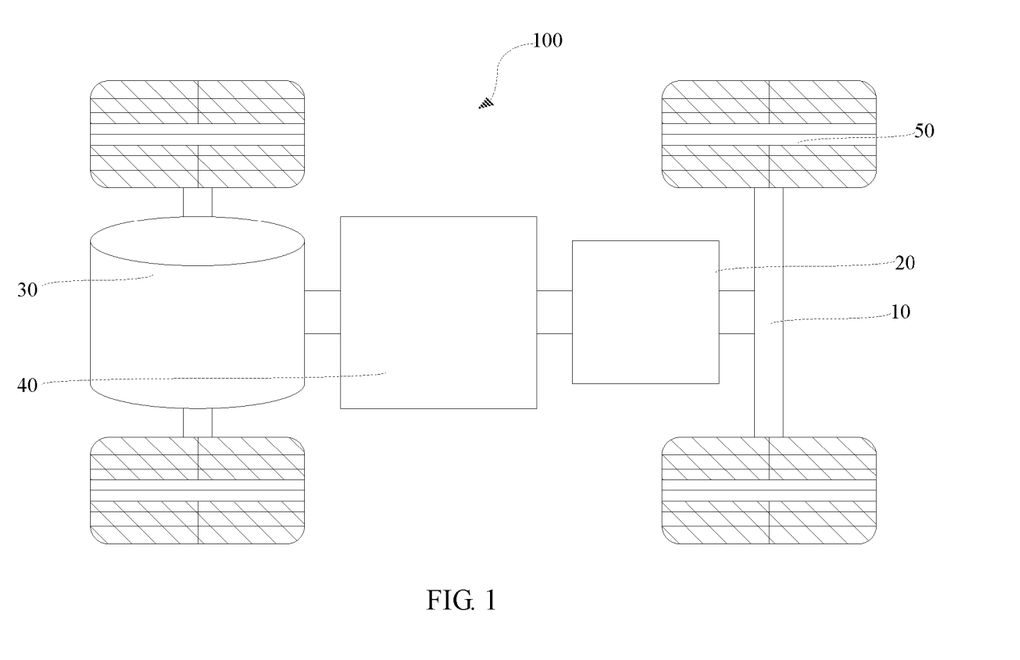
FIG. 1 is a schematic structural diagram of an apparatus according to an embodiment of this application.

As shown in FIG. 1, a vehicle may include a vehicle body 10 and a battery 20 arranged in vehicle body 10. The vehicle body 10 may include a carriage and a drive mechanism 30 and wheels 50 arranged on the carriage. The drive mechanism 30 is connected to the wheels 50 through a transmission mechanism. The battery 20 is electrically connected to the drive mechanism 30 to supply electric energy to the drive mechanism 30 so as to provide power to the wheels 50, so that the wheels 50 travel along a predefined route.

The carriage may further be provided with a controller 40, where the controller 40 may be configured to control the battery 20 to supply power to the drive mechanism 30.

In addition to supplying electric energy to the drive mechanism 30 and the controller 40, the battery 20 in this embodiment of this application may further supply electric energy to a navigation system of the vehicle.

Figure 2:
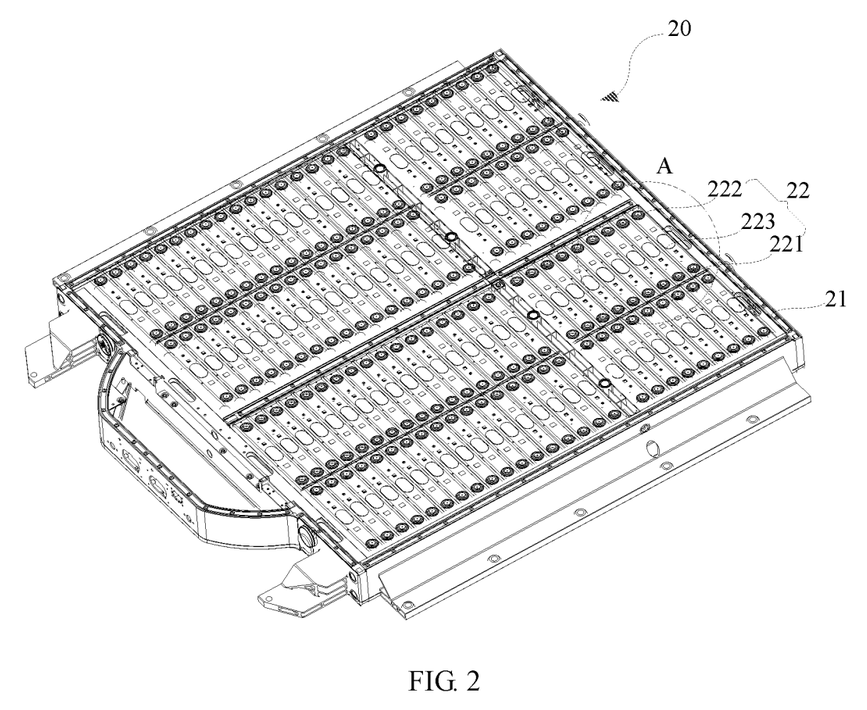
FIG. 2 is a schematic structural diagram of a battery according to an embodiment of this application.
Figure 3:
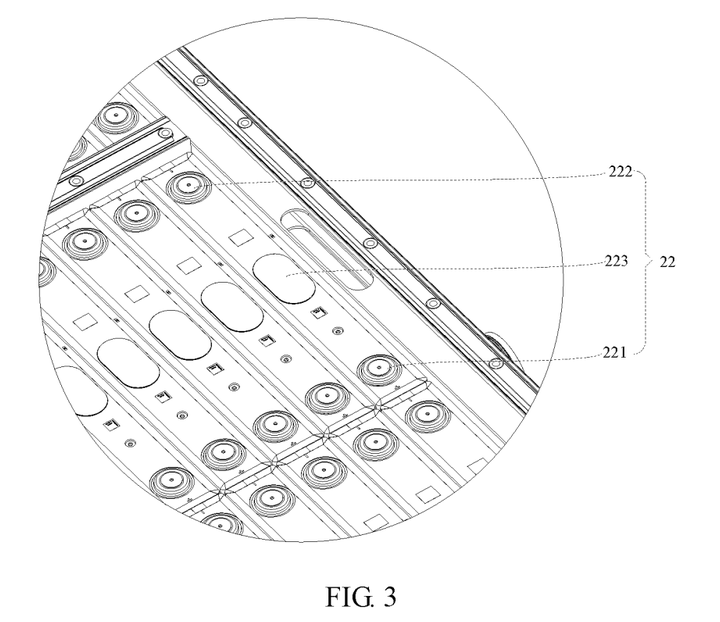
FIG. 3 is a locally enlarged schematic diagram of zone A in FIG. 2.

As shown in FIG. 2 and FIG. 3, an embodiment of this application provides a battery 20, where the battery 20 may be applied to the foregoing apparatus 100, and the battery 20 includes a box 21 and a battery cell 22.

The box 21 has an accommodation cavity, so that a plurality of battery cells 22 can be installed inside the accommodation cavity. The plurality of battery cells 22 are arrayed inside the box 21. Each battery cell 22 usually includes an electrode assembly (not shown) and an electrolyte solution (not shown). The electrode assembly includes a positive electrode plate, a negative electrode plate, and a separator between the positive electrode plate and the negative electrode plate. The battery cell 22 mainly relies on movement of metal ions (such as lithium ions) between the positive electrode plate and the negative electrode plate to supply electric energy.

The positive electrode plate includes a positive electrode current collector and a positive electrode active material layer, where a surface of the positive electrode current collector is coated with the positive electrode active material layer. A current collector not coated with the positive electrode active material layer protrudes from a current collector already coated with the positive electrode active material layer, and the current collector not coated with the positive electrode active material layer serves as a positive tab. A lithium-ion battery is used as an example. A positive electrode current collector may be made of aluminum and a positive electrode active material may be lithium cobaltate, lithium iron phosphate, ternary lithium, lithium manganate, or the like.

The negative electrode plate includes a negative electrode current collector and a negative electrode active material layer, where a surface of the negative electrode current collector is coated with the negative electrode active material layer. A current collector not coated with the negative electrode active material layer protrudes from a current collector already coated with the negative electrode active material layer, and the current collector not coated with the negative electrode active material layer serves as a negative tab. A lithium-ion battery is used as an example. A negative electrode current collector may be made of copper and a negative electrode active material may be carbon, silicon, or the like.

The separator may be made of PP, PE, or the like. In addition, the electrode assembly may be a roll-type structure or a laminated structure, and there may be one or more electrode assemblies, which is not specifically limited in this embodiment of this application.

The battery cell 22 further includes a housing, and the electrode assembly and the electrolyte solution are both encapsulated inside the housing. The housing may be a hollow cuboid, cube, or cylinder. The housing may be made of aluminum or steel, or an alloy thereof, or may be made of a plastic material or an aluminum-plastic film.

The housing is further provided with a positive electrode terminal 221 and a negative electrode terminal 222. The positive tab is electrically connected to the positive electrode terminal 221 and the negative tab is connected to the negative electrode terminal 222, to output electric energy.

The housing is further provided with an explosion-proof valve 223. The explosion-proof valve 223 may be arranged at any position of the housing. For example, the explosion-proof valve 223 may be arranged at the top, the bottom, or a side of the housing. The explosion-proof valve 223 may alternatively be arranged between the positive electrode terminal 221 and the negative electrode terminal 222. This is not specifically limited in this application, as long as internal pressure of the battery cell 22 can be released.

In some embodiments, as shown in FIG. 4 to FIG. 7, the box 21 may include a bottom wall 211 and a side wall 212 connected to a periphery of the bottom wall 211. The bottom wall 211 and the side wall 212 enclose an accommodation cavity 213 for disposing the battery cell 22. In this embodiment, the battery cell 22 accommodated inside the accommodation cavity 213 is protected by using the box 21. The accommodation cavity 213 may be of a regular shape such as a rectangle, or may be of any other irregular shape.

The accommodation cavity 213 may include a plurality of sub-accommodation cavities. For example, a plurality of spacer plates 214 are arranged inside the accommodation cavity 213. The plurality of spacer plates 214 are arranged in a crisscross pattern inside the accommodation cavity 213 to split the accommodation cavity 213 into a plurality of sub-accommodation cavities. This can increase structural strength of the box 21 and facilitate arrangement of the battery cell 22.

The box 21 may further include a top wall (not shown in the figures). The top wall covers the top of the side wall 212 to prevent external substances from entering the accommodation cavity 213 of the box 21 from a top opening enclosed by the side wall 212, thereby improving cleanness and safety of the accommodation cavity 213.

It should be understood that the side wall 212 in this embodiment may be separate structures, that is, the side wall 212 may be formed by sequentially connecting four sub-side walls. The side wall 212 may alternatively be an integrated structure. When the side wall 212 is an integrated structure, structural strength of the box 21 can be improved.

When thermal runaway occurs in the battery cell 22, high-temperature high-pressure gas, flame, or other emissions may be produced. The foregoing substances are released from the explosion-proof valve 223 of the battery cell 22 into the accommodation cavity 213. In order to discharge the high-temperature high-pressure gas, flame, or other emissions to outside the box 21, a discharge hole 215 is usually arranged in the box 21. The discharge hole 215 is configured to discharge the high-temperature high-pressure gas, flame, or other emissions to outside the box 21.

The discharge hole 215 may be arranged on at least one wall of the box 21. For example, the discharge hole 215 may be arranged on the foregoing top wall, bottom wall 211, or side wall 212. For another example, the discharge hole 215 may be arranged on both the bottom wall 211 and the side wall 212, or may be arranged on both the side wall 212 and the top wall.

Figure 4:
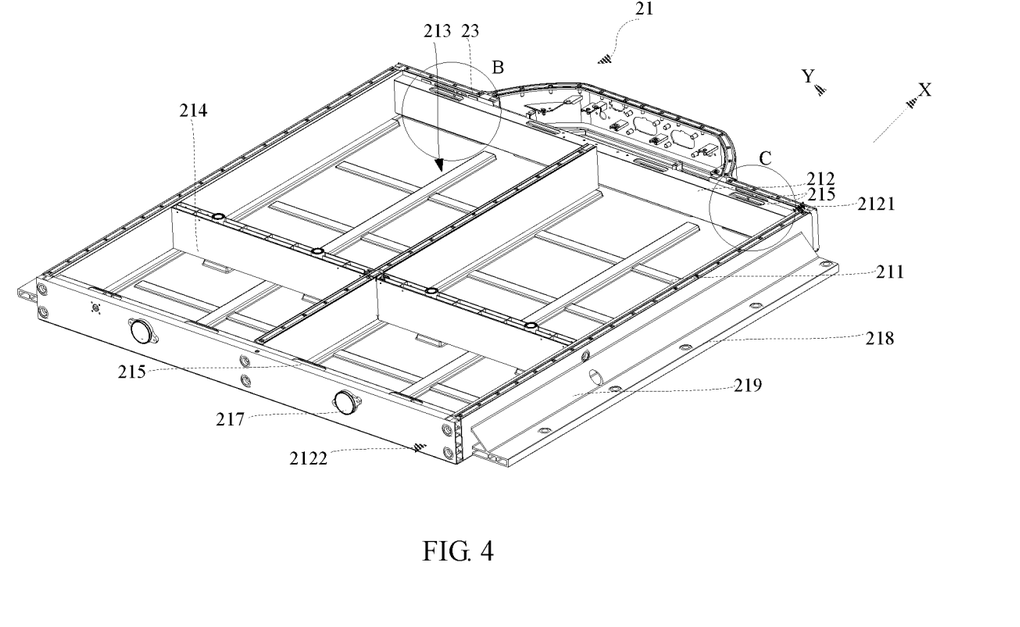
FIG. 4 is schematic structural diagram 1 of a box according to an embodiment of this application.

When the discharge hole 215 is arranged on the side wall 212, as shown in FIG. 4, the discharge hole 215 may be arranged on two opposite sub-side walls. The two sub-side walls may be arranged in a length direction of the box 21 at an interval, where the length direction of the box 21 is an X direction in FIG. 4. A plurality of discharge holes 215 may be arranged on each sub-side wall. The plurality of discharge holes 215 are arranged in a width direction of the box 21 at an interval, where the width direction of the box 21 is a Y direction in FIG. 4.

When the battery cell 22 is impacted by the outside or affected by the battery cell 22 itself (for example, when the battery cell 22 is overcharged or short-circuited), thermal runaway may occur in the battery cell 22. The battery cell 22 releases flame or other substances, and the flame is also discharged from the discharge hole 215. To prevent fire from occurring inside the box 21 and threatening safety of the battery 20 and safety of the apparatus 100 using the battery 20, in this embodiment of this application, a fire extinguishing member 23 is arranged in the box 21. When the flame passes through the discharge hole 215, the fire extinguishing member 23 is capable of extinguishing and cooling the flame, thereby preventing the flame from spreading to outside the box and ensuring safety of the apparatus 100 and a user using the battery 20.

In this embodiment, the other substances released by the battery cell 22 may be electrolyte solution, metal scraps, or solid particles.

Thermal runaway in the battery cell 22 refers to accumulative enhancement and gradual damage during the use of the battery cell 22. For example, the battery cell 22 generates heat during operating. In a normal state, the heat generated by the battery cell 22 is controllable. However, in an abnormal state, such as an impacted or overcharged state, the heat generated by the battery cell 22 is uncontrollable, which leads to thermal runaway.

Figure 5:
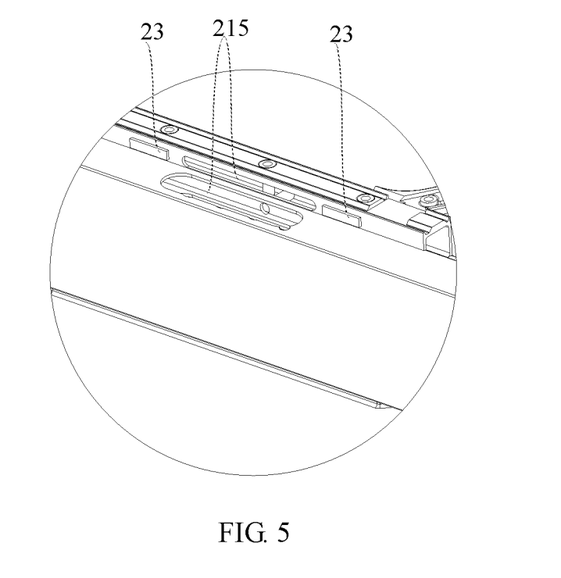
FIG. 5 is a locally enlarged schematic diagram of zone B in FIG. 4.

The fire extinguishing member 23 is configured to extinguish the flame for cooling when the flame passes through the discharge hole 215. Therefore, the fire extinguishing member 23 needs to correspond to the discharge hole 215. In other words, as shown in FIG. 5, the fire extinguishing member 23 may be arranged at a periphery of the discharge hole 215. When the flame passes through the discharge hole, the fire extinguishing member 23 is capable of extinguishing and cooling the flame in a timely manner. This prevents the flame from being discharged from the discharge hole 215 to outside the box 21, and avoids a threat to safety of the apparatus 100 and a user using the battery 20, thereby improving safety performance of the battery 20.

It should be noted that the periphery in this embodiment may be understood as a zone that is on the side wall 212 of the box 21 and that is close to an edge of the discharge hole 215, or a zone that is on the bottom wall 211 of the box 21 and that is close to an edge of the discharge hole 215.

In this embodiment, the fire extinguishing member 23 may be separate structures, that is, the fire extinguishing member 23 may include a plurality of fire extinguishing sub-members, and the plurality of fire extinguishing sub-members are arranged along the edge of the discharge hole 215 at an interval. The fire extinguishing member 23 may alternatively be an integrated structure. For example, the discharge hole 215 may be of a circular shape. Correspondingly, the fire extinguishing member 23 may also be of a ring shape, and the ring-shaped fire extinguishing member 23 is arranged around the discharge hole 215.

In some embodiments, the fire extinguishing member 23 is configured to cover a part of the discharge hole 215. That is, an edge that is of the fire extinguishing member 23 and that is close to the discharge hole 215 may coincide with the edge of the discharge hole 215. Alternatively, the fire extinguishing member 23 is close to the edge of the discharge hole 215 and a part of the fire extinguishing member 23 is located inside the discharge hole 215 but does not cover the entire discharge hole 215. In this way, when the flame passes through the discharge hole 215, the flame can quickly come into contact with the fire extinguishing member 23, and the fire extinguishing member 23 is capable of extinguishing and cooling the flame in a timely manner. This prevents the flame from being discharged from the discharge hole 215 to outside the box 21, and avoids a threat to safety of the apparatus 100 and a user using the battery 20, thereby improving safety performance of the battery 20.

In addition, the fire extinguishing member 23 does not cover the entire discharge hole 215. In this way, when thermal runaway does not occur in the battery cell 22, gas inside the accommodation cavity 213 can be discharged from inside the box 21 through the discharge hole 215, to keep atmospheric pressure balance between inside and outside of the box 21 and improve safety of the battery 20.

Figure 8:
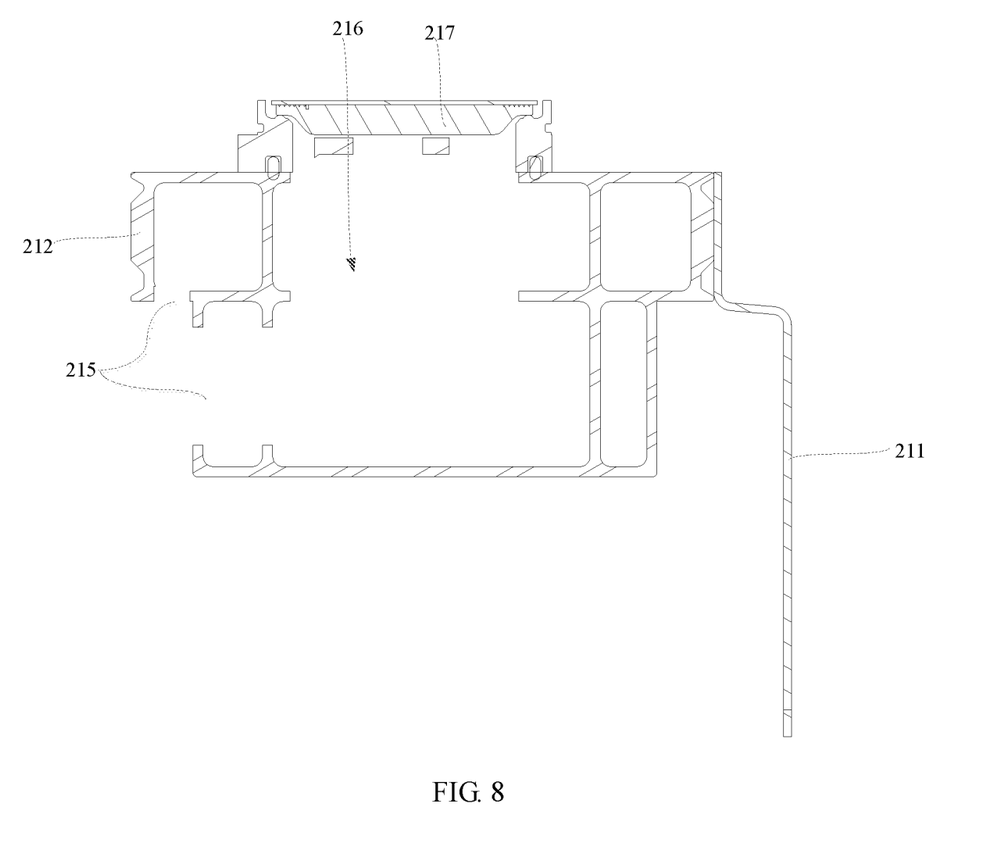
FIG. 8 is a sectional view along the D-D direction in FIG. 7.

In some embodiments, as shown in FIG. 8, there is a discharge passage 216 inside the side wall 212 and/or the bottom wall 211. That is, at least one of the side wall 212 and the bottom wall 211 has a hollow cavity, and the hollow cavity forms the discharge passage 216. One end of the discharge passage 216 is connected to the discharge hole 215, and the other end of the discharge passage 216 is connected to outside the box 21. When internal pressure or temperature of the battery cell 22 reaches a threshold, the flame generated by the battery cell 22 is extinguished and cooled, then discharged into the discharge passage 216, and then discharged to outside the box 21 through the other end of the discharge passage 216.

After the extinguishing and cooling, the flame generated by the battery cell 22 becomes low-temperature gas. In this embodiment, the discharge passage 216 is provided to buffer the gas and prevent the box 21 from being damaged by an excessively high speed of the low-temperature gas.

It should be noted that the discharge passage 216 in this embodiment may be of a regular shape such as a hollow rectangle, or may be of any another irregular shape.

Further, the fire extinguishing member 23 is arranged inside the discharge passage 216. The flame generated when thermal runaway occurs in the battery cell 22 is preferentially transferred to the fire extinguishing member 23 at the periphery of the discharge hole 215. The flame is extinguished for the first time by using the fire extinguishing member 23 at the periphery of the discharge hole 215. Gas generated after a part of the flame is extinguished and a part of the flame that is not extinguished enters the discharge passage 216 through the discharge hole 215. In this case, the fire extinguishing member 23 arranged inside the discharge passage 216 extinguishes the flame for the second time. In this embodiment, the flame is extinguished twice, which can ensure that gas discharged to outside the box 21 basically contains no or extremely low content of flame, thereby improving safety of the battery 20.

In some embodiments, the box 21 according to this embodiment further includes a pressure relief valve 217 to facilitate timely and efficient discharge of emissions of the battery cell 22 to outside the box 21. The other end of the discharge passage 216 is connected to outside the box 21 through the pressure relief valve 217, and the pressure relief valve 217 is configured to discharge internal pressure of the discharge passage 216 when the internal pressure reaches a threshold.

A position for arrangement of the pressure relief valve 217 is described in the following embodiment. It should be noted that the following embodiment merely shows an example of a feasible embodiment, and does not limit the pressure relief valve 217 of the box.

Figure 6:
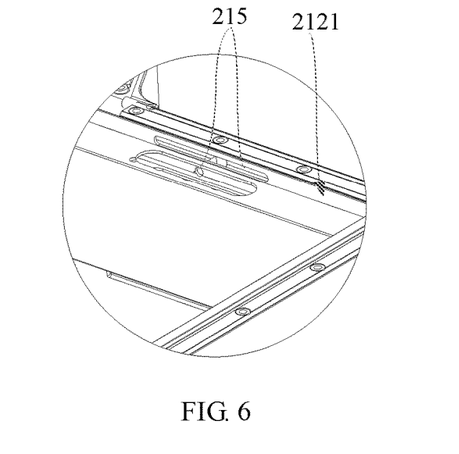
FIG. 6 is a locally enlarged schematic diagram of zone C in FIG. 4.
Figure 7:
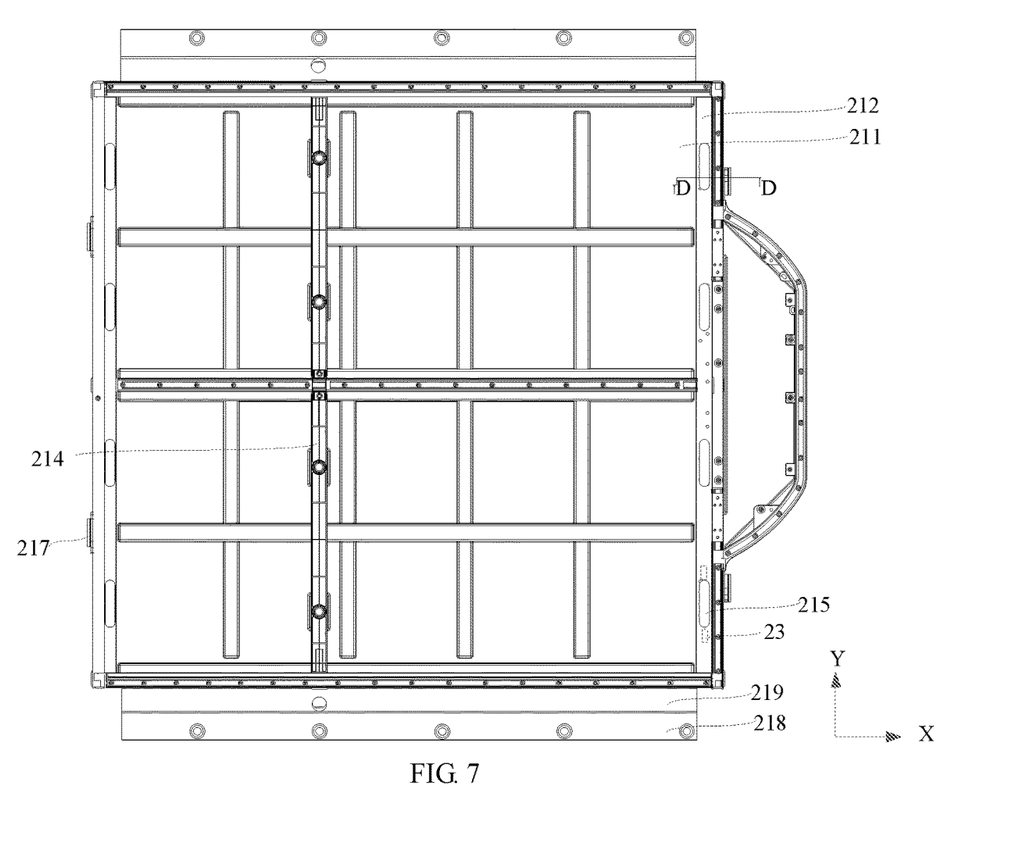
FIG. 7 is a top view of a box according to an embodiment of this application.

As shown in FIG. 4 and FIG. 6, the side wall 212 has a first side face 2121 and a second side face 2122 that are opposite to each other. The first side face 2121 is close to the accommodation cavity 213 of the box 21, and the discharge hole 215 is arranged on the first side face 2121. Accordingly, the pressure relief valve 217 is arranged on the second side face 2122. A projection of the pressure relief valve 217 onto the first side face 2121 may be located inside the discharge hole 215. That is, the discharge hole 215 is opposite to the pressure relief valve 217. This can facilitate timely and efficient discharge of the emissions of the battery cell 22 to outside the box 21.

In this embodiment, the box 21 may further be provided with a connection plate 218 and the battery 20 may be installed on the apparatus 100 by using the connection plate 218. For example, the battery 20 is installed on the carriage of the vehicle by using the connection plate 218.

The connection plate 218 is provided with a reinforcing plate 219. An end that is of the reinforcing plate 219 and that faces away from the connection plate 218 is connected to the side wall 212 of the box 21, to increase structural strength of the connection plate 218.

In some embodiments, the fire extinguishing member 23 is constructed as a fire extinguishing plate including a fire extinguishing agent. The fire extinguishing plate is fastened inside the box 21, that is, the fire extinguishing plate may be fastened to the bottom wall 211 and/or the side wall 212 through bonding. The fire extinguishing plate is configured to release the fire extinguishing agent when the flame passes through the discharge hole 215 to extinguish the flame for cooling.

A manner of arranging the fire extinguishing plate and the fire extinguishing agent may be described in the following two embodiments. It should be noted that the following two embodiments merely show examples of two feasible embodiments, and do not limit the manner of providing the fire extinguishing plate and the fire extinguishing agent.

In one embodiment, the fire extinguishing member 23 may be a fire extinguishing plate that has a cavity, and the fire extinguishing agent may be arranged in the cavity of the fire extinguishing plate. Accordingly, the fire extinguishing plate may be provided with a plurality of openings. When the flame passes through the discharge hole 215, the fire extinguishing agent absorbs a large amount of heat and experiences a physical heat absorption process such as hot melting or gasification, so that the gasified fire extinguishing agent spreads to the discharge hole 215 through the openings, to extinguish the flame for cooling.

In the other embodiment, the fire extinguishing member 23 is a dense fire extinguishing plate formed by compressing the fire extinguishing agent. The fire extinguishing agent contains metallic salt microparticles. In this way, metal salt ions have functions of physical cooling and suppression, gas phase chemical suppression, solid phase chemical suppression, and oxygen concentration reduction.

When the flame passes through the discharge hole 215, the fire extinguishing agent absorbs a large amount of heat and experiences a physical heat absorption process such as hot melting or gasification, so that the gasified fire extinguishing agent spreads to the discharge hole, to extinguish the flame for cooling.

Under the action of heat, the fire extinguishing agent can decompose to produce gasified metal ions, or cation that loses electrons undergoes affinity reaction with a burning active group, which significantly consumes active groups and reduce free radicals.

The fire extinguishing agent contains a large quantity of microparticles. These microparticles have a very large surface area and surface energy, are capable of absorbing burning active groups, and undergo chemical reaction to significantly consume the active groups and reduce free radicals.

In addition, the fire extinguishing agent may produce a large amount of inert gas such as nitrogen and carbon dioxide, which can reduce oxygen concentration during burning and prevent further burning.

Further, the fire extinguishing plate is provided with a through hole (not shown in the figures). The through hole is connected to the discharge hole 215, to increase an area of contact between the flame and the fire extinguishing plate and enhance a fire extinguishing effect of the fire extinguishing plate.

There may be a plurality of through holes. The plurality of through holes are arranged in a honeycomb pattern on the fire extinguishing plate and the through holes are connected to the discharge hole 215. In this way, before thermal runaway occurs in the battery cell 22, gas inside the accommodation cavity 213 may be discharge to outside the box 21 through the through holes and the discharge hole 215. When thermal runaway occurs in the battery cell 22, an area of contact between the flame and the fire extinguishing plate may be increased when the flame passes the fire extinguishing plate, thereby enhancing the fire extinguishing effect of the fire extinguishing plate.

Figure 9:
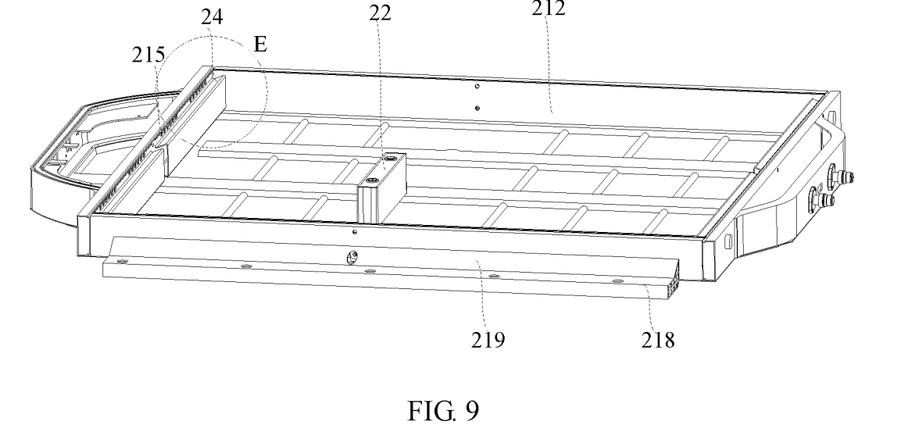
FIG. 9 is schematic structural diagram 2 of a box according to an embodiment of this application.
Figure 10:
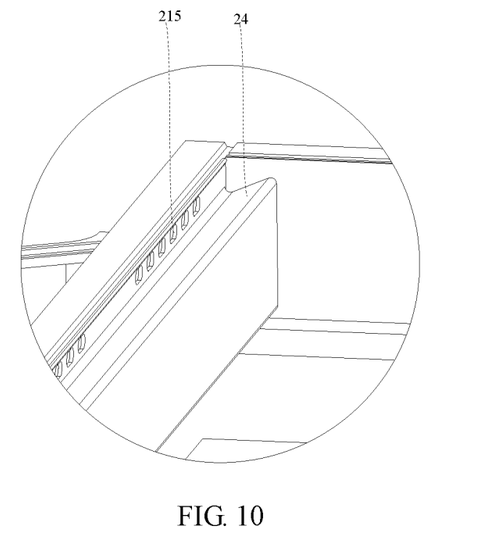
FIG. 10 is a locally enlarged schematic diagram of zone E in FIG. 9.

In some embodiments, as shown in FIG. 9 and FIG. 10, the box 21 further includes an accommodation groove 24, the accommodation groove 24 is configured to accommodate the fire extinguishing member 23, and the discharge hole 215 is arranged on a groove wall of the accommodation groove 24.

The accommodation groove 24 may be arranged on the side wall 212 and/or the bottom wall 211. When the accommodation groove 24 is arranged on the side wall 212, the accommodation groove 24 may be provided on any sub-side wall. For example, directions shown in FIG. 9 are used as examples. The accommodation groove 24 is arranged on a left side wall, and a side face that is of the left side wall and that is close to the accommodation cavity 213 includes two adjacent sub-side faces. One sub-side face is perpendicular to a horizontal direction, and the other sub-side face is oblique with respect to the horizontal direction. That is, there is a predefined angle between the two adjacent sub-side faces, so that the two adjacent sub-side faces enclose the accommodation groove 24. This can increase space configured to install the fire extinguishing member 23, so that a plurality of fire extinguishing members 23 can be installed inside the accommodation groove 24 and a fire extinguishing effect of the fire extinguishing member 23 is improved.

In addition, in actual application, external vapor may enter the box 21 through the discharge hole 215. In this embodiment, the accommodation groove 24 may further store vapor coming from outside the box 21 into the box 21, and prevent the vapor from coming into contact with the positive electrode terminal 221 and/or the negative electrode terminal 222 of the battery cell 22 to cause a short circuit of the battery cell 22 and affect service life of the battery cell 22.

In this embodiment, the predefined angle may be an acute angle, so that the two adjacent sub-side faces enclose a V-shaped accommodation groove 24. To increase an area of the V-shaped accommodation groove 24, smooth transition may be formed between the two adjacent sub-side faces, so that the two adjacent sub-side faces form a U-shaped accommodation groove 24.

It should be noted that there may be a plurality of discharge holes 215, and the plurality of discharge holes 215 are arranged at intervals along a width direction of the side wall 212.

Figure 11:
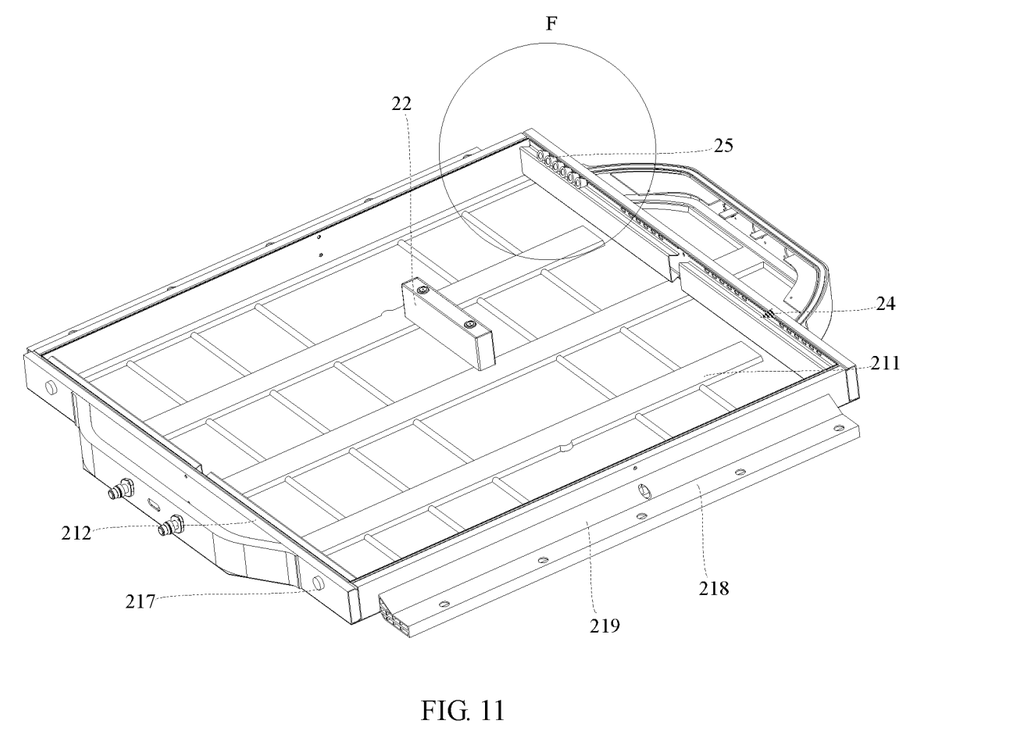
FIG. 11 is schematic structural diagram 3 of a box according to an embodiment of this application.

In some embodiments, as shown in FIG. 11, the box 21 further includes a guide member 25, where the guide member 25 is connected to the periphery of the discharge hole 215, that is, the guide member 25 is arranged around the discharge hole 215. The guide member 25 is configured to guide the flame to the discharge hole 215 to prevent the flame from gathering inside the box 21, and reduce a risk of fire in the battery cell 22.

To accelerate fire extinguishing by the fire extinguishing member 23, the guide member 25 includes a guide channel 252 connected to the discharge hole 215, and the fire extinguishing member 23 is arranged inside the guide channel 252. When the flame is transferred to the guide channel 252, the flame quickly comes into contact with the fire extinguishing member 23, and the flame can be extinguished and cooled in a timely and efficient manner.

Figure 12:
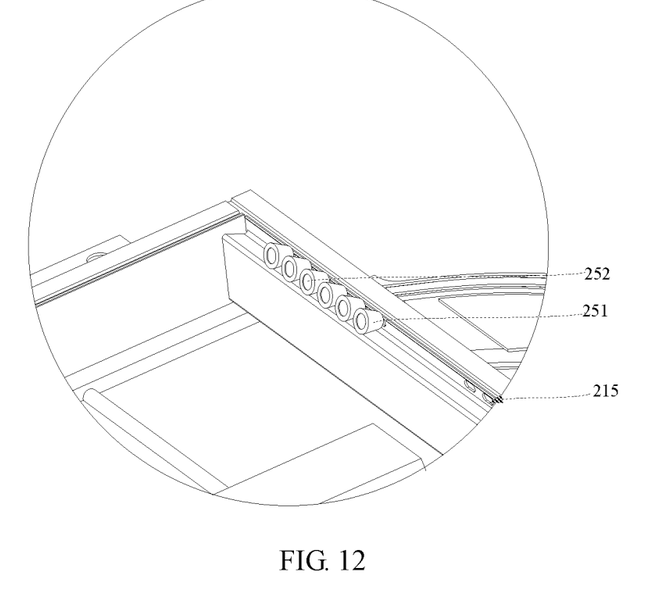
FIG. 12 is a locally enlarged schematic diagram of zone F in FIG. 11.

In an optional embodiment of the guide member 25, as shown in FIG. 12, the guide member 25 includes a barrel body 251 with openings at both ends, and an internal chamber of the barrel body 251 is configured to form the guide channel 252. One end of the guide member 25 may be fastened to the side wall 212, and the guide channel 252 is connected to the discharge hole 215.

To improve stability of the guide member 25, an exterior surface of the guide member 25 may further be fixedly connected to the groove wall of the accommodation groove 24. In this embodiment, the fixed connection may be implemented through welding or bonding.

A diameter of the barrel body 251 gradually increases from an end close to the discharge hole 215 to an end far away from the discharge hole 215. To be specific, the barrel body 251 has a circular truncated cone shape and is similar to a chimney structure. Accordingly, an eddy effect may be formed inside the barrel body 251, which can transmit high-temperature high-pressure gas, flame, or other substances produced by the battery cell 22 into the discharge passage 216 of the box 21 in a timely and efficient manner, thereby facilitating extinguishing and cooling of the high-temperature high-pressure gas and flame and improving safety performance of the battery 20.

In addition, when thermal runaway occurs in a battery cell 22 and flame appears, the guide member 25 is capable of transmitting the flame produced by the battery cell 22 into the guide channel 252 in a timely and efficient manner, so that the flame quickly comes into contact with the fire extinguishing member 23 inside the barrel body 251, and the flame is extinguished and cooled in a timely and efficient manner. This prevents the flame from being transmitted to other battery cells 22 that are adjacent to the battery cell 22 with the thermal runaway, and prevents heat spreading caused by thermal runaway in other battery cells 22, thereby improving the safety performance of the battery 20.

In this embodiment, a quantity of guide members 25 is the same as a quantity of discharge holes 215. For example, when there is one discharge hole 215, there is accordingly one guide member 25. For another example, when there are a plurality of discharge holes 215, the plurality of discharge holes 215 are arranged at intervals along the width direction of the side wall 212, and each discharge hole 215 is provided with a guide member 25. The plurality of guide members 25 are provided to enhance guiding by the guide members 25.

Figure 13:
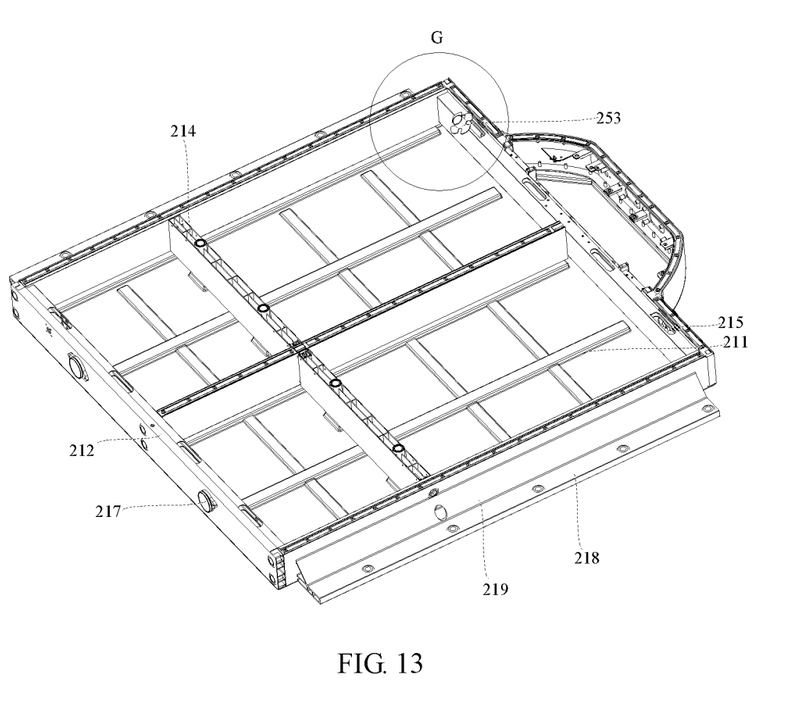
FIG. 13 is schematic structural diagram 4 of a box according to an embodiment of this application.
Figure 14:
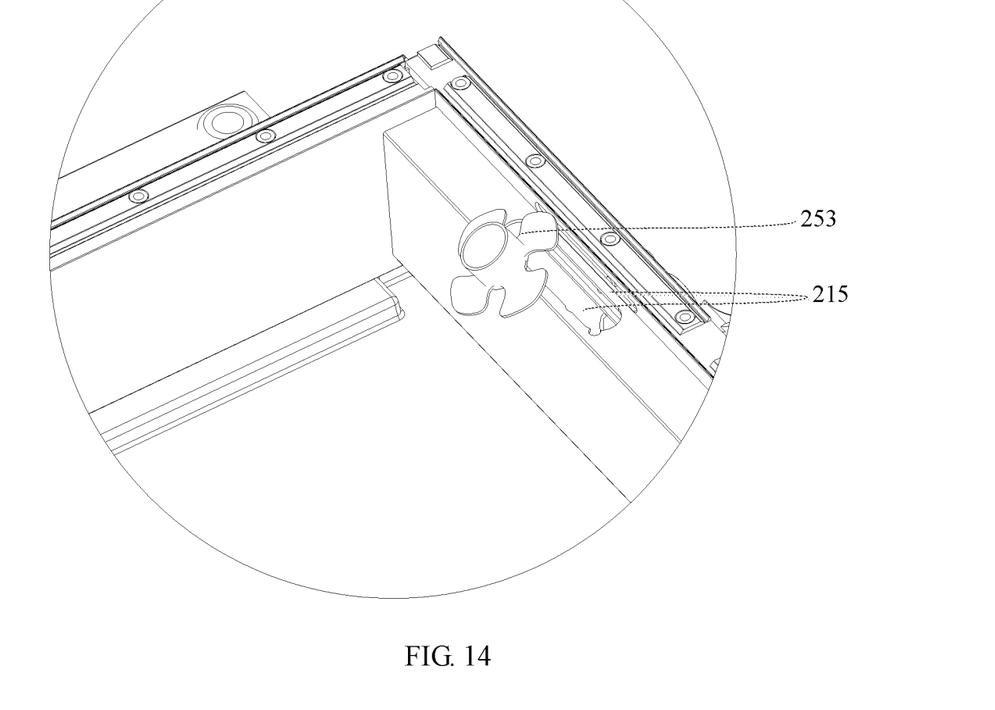
FIG. 14 is a locally enlarged schematic diagram of zone G in FIG. 13.

In another optional embodiment of the guide member 25, as shown in FIG. 13 and FIG. 14, the guide member 25 further includes a fan 253. The fan 253 may be fastened on the side wall 212 and/or the bottom wall 211, and the fan 253 is configured to start when thermal runaway occurs in the battery cell 22 to promote flowing of the flame to the discharge hole 215.

When a side face that is of the side wall 212 and that is close to the accommodation cavity 213 includes two adjacent sub-side faces, one sub-side face is perpendicular to a horizontal direction and the other sub-side face is parallel to the horizontal direction to form a structure shown in FIG. 13 or FIG. 14. In this way, the fan 253 may be fastened on the sub-side face that is parallel to the horizontal direction, and an outlet of the fan 253 corresponds to the discharge hole 215.

In this embodiment, the discharge hole 215 may be arranged on the sub-side face that is perpendicular to the horizontal direction or the sub-side face that is parallel to the horizontal direction. Alternatively, the discharge hole 215 is arranged on both sub-side faces. This can increase flow paths of the flame, and a quantity of fire extinguishing members 23 can be increased to accelerate fire extinguishing and improve the safety performance of the battery 20.

The fan 253 may further be electrically connected to a battery management system (not shown in the figures), and the battery management system supplies power to the fan and controls an operating status of the fan. When thermal runaway occurs in the battery cell 22, the battery management system receives a warning signal and controls the fan to start operating. In this way, the flame produced when thermal runaway occurs in the battery cell 22 is quickly transmitted to the discharge hole 215 and to the discharge passage 216, and the flame is extinguished and cooled by using the fire extinguishing member 23. This improves the safety performance of the battery 20.

Further, the guide member 25 further includes a fan guard (not shown in the figures). The fan 253 is arranged inside the fan guard and the fan 253 is protected by using the fan guard.

The fan guard is fastened inside the box 21. To be specific, the fan guard may be fastened on the side wall 212 and/or the bottom wall 211. It should be understood that in this embodiment, the fan guard may be directly fastened on the side wall 212 and/or the bottom wall 211 of the box 21, or may be fastened on the side wall 212 and/or the bottom wall 211 of the box by using a holder.

The fan guard has an air inlet and an air outlet that are connected to each other. The air inlet forms the guide channel 252 and the air outlet is located above the discharge hole 215. In this way, the flame produced by the battery cell 22 can be transmitted to the guide channel 252 in a timely and efficient manner.

In this embodiment, the fire extinguishing member 23 may be arranged inside the air inlet, and the fire extinguishing member 23 is honeycomb-shaped. When no thermal runaway occurs in the battery cell 22, the fan 253 can transmit gas inside the box 21 into the discharge passage 216 of the box 21 in a timely and efficient manner and then discharge the gas to outside the box 21 to keep pressure balance between inside and outside of the box 21.

In addition, when thermal runaway occurs in a battery cell 22 and flame appears, the fan 253 is capable of transmitting the flame produced by the battery cell 22 into the guide channel 252 in a timely and efficient manner, so that the flame quickly comes into contact with the fire extinguishing member 23 inside the fan guard, and the flame is extinguished and cooled in a timely and efficient manner. This prevents the flame from being transmitted to other battery cells 22 that are adjacent to the battery cell 22 with the thermal runaway, and prevents heat spreading caused by thermal runaway in other battery cells 22, thereby improving the safety performance of the battery 20.

Although this application has been described with reference to some embodiments, various modifications can be made to this application without departing from the scope of this application and the components therein can be replaced with equivalents. In particular, as long as there is no structural conflict, the various technical features mentioned in the embodiments can be combined in any manner. This application is not limited to the specific embodiments disclosed in this specification, but includes all technical solutions falling within the scope of the claims.

What is claimed is:

1. A box for a battery, wherein the box comprises:
   a bottom wall and a side wall connected to a periphery of the bottom wall, the bottom wall and the side wall enclose an accommodation cavity for disposing a battery cell therein;
   a discharge hole arranged on the side wall, wherein the discharge hole is configured to allow passage of flame produced from inside the box when thermal runaway occurs in the battery cell disposed in the accommodation cavity;

a discharge passage inside the side wall, wherein the discharge passage is connected to the discharge hole and to outside of the box;

a pressure relief valve arranged on a side face of the side wall and opposite to the discharge hole, wherein the discharge passage is connected to outside the box through the pressure relief valve, and the pressure relief valve is configured to discharge internal pressure of the discharge passage when the internal pressure reaches a threshold;

a fire extinguishing member comprising an extinguishing plate fastened to the side wall through bonding and a fire extinguishing agent included in the extinguishing plate, wherein the fire extinguishing plate is configured to release the fire extinguishing agent to extinguish the flame for cooling when the flame passes through the discharge hole and prevent the flame from being discharged to the outside of the box; and a guide member, wherein the guide member is connected to the periphery of the discharge hole and comprises a guide channel connected to the discharge hole, the guide member is fastened to the side wall, the fire extinguishing member is arranged inside the guide channel, and the guide member is configured to guide the flame to the discharge hole and prevent the flame from gathering inside the box, wherein the guide member comprises a barrel body with openings at both ends, an internal chamber of the barrel body is configured to form the guide channel, and a diameter of the barrel body gradually increases from an end close to the discharge hole to an end far away from the discharge hole.

2. The box according to claim 1, wherein the fire extinguishing member is arranged at a periphery of the discharge hole.

3. The box according to claim 1, wherein the fire extinguishing member is configured to cover a part of the discharge hole.

4. The box according to claim 1, wherein the box further comprises an accommodation groove, the accommodation groove is configured to accommodate the fire extinguishing member, and the discharge hole is arranged on a groove wall of the accommodation groove.

5. The box according to claim 1, wherein the guide member further comprises a fan fastened on the side wall, an outlet of the fan corresponds to the discharge hole, the fan is electrically connected to a battery management system that supplies power to the fan and controls an operating status of the fan, and the fan is configured to start when thermal runaway occurs in the battery cell, to promote flowing of the flame to the discharge hole.

6. A battery, comprising the box according to claim 1 and a battery cell, wherein the battery cell is arranged inside the accommodation cavity.

7. An apparatus, comprising the battery according to claim 6, wherein the battery is configured to supply electric energy.

* * * * *